Aug. 4, 1925.
W. P. THORNTON
1,548,109
PROCESS OF AND APPARATUS FOR EXTRACTING SULPHUR FROM ORE
Filed Feb. 16, 1920   3 Sheets-Sheet 3
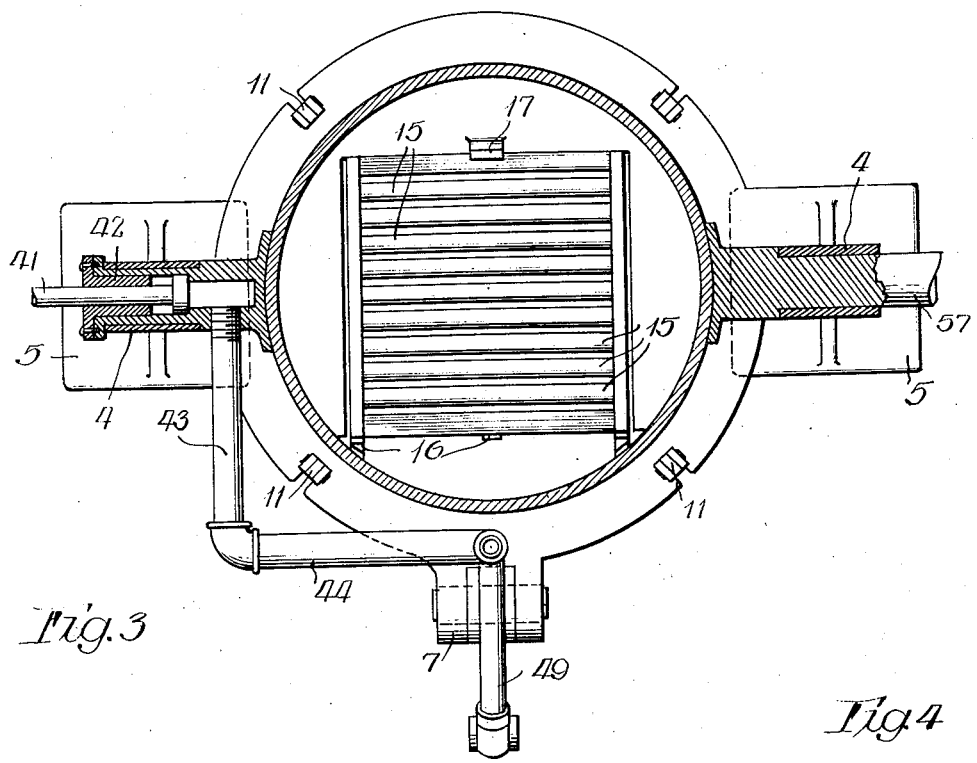
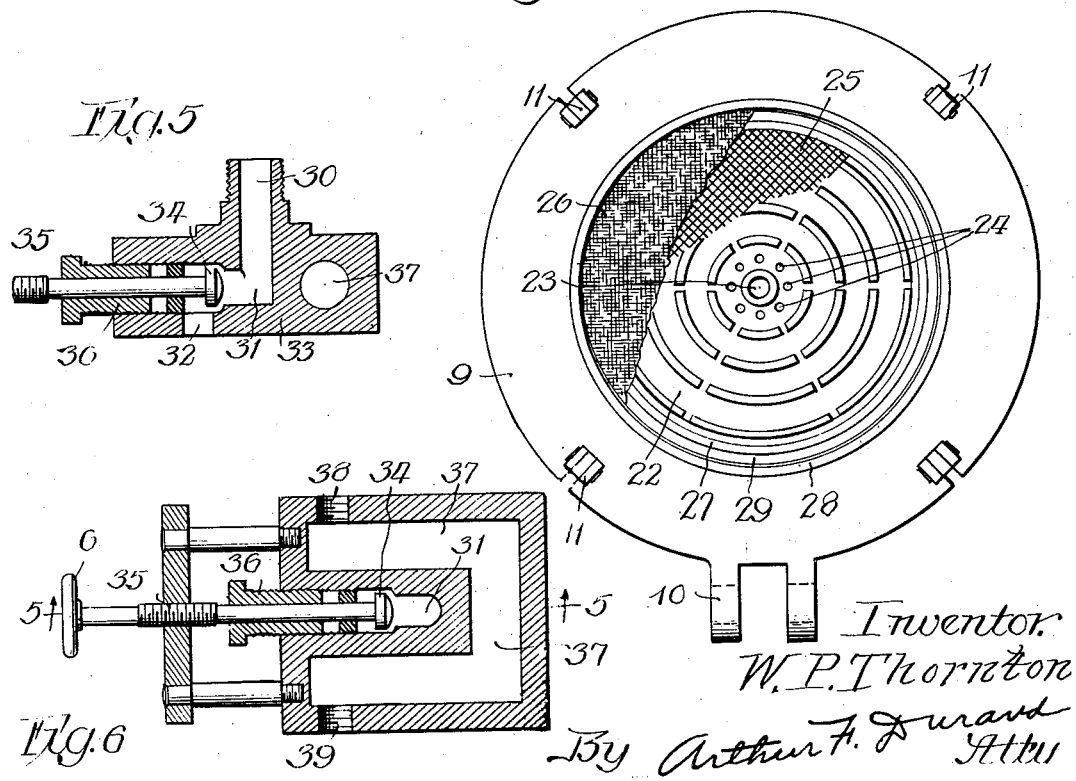
Inventor
W. P. Thornton
By Arthur F. Durand
Atty Patented Aug. 4, 1925.

1,548,109

UNITED STATES PATENT OFFICE.

WILLIAM P. THORNTON, OF PARK RIDGE, ILLINOIS.

PROCESS OF AND APPARATUS FOR EXTRACTING SULPHUR FROM ORE.

Application filed February 16, 1920. Serial No. 358,819.

*To all whom it may concern:*

Be it known that I, WILLIAM P. THORNTON, a citizen of the United States of America, and a resident of Park Ridge, Illinois, have invented a certain new and useful Improvement in Processes of and Apparatus for Extracting Sulphur from Ore, of which the following is a specification.

This is an improvement on the process and apparatus described and shown in application No. 284,780, filed March 24, 1919, and No. 301,687, filed June 4, 1919.

Generally stated, the object of the invention is to provide an improved process and apparatus which will wash, so far as possible, from the melted sulphur before straining it, all earthy matter and all matter that might clog the straining medium, and also to provide a straining medium which is so arranged that it will be washed clean and kept clean up to the time of straining the sulphur, thereby to insure efficient operation of the apparatus.

It is also an object to provide certain details and features of improvement tending to increase the general efficiency and the desirability of an apparatus and process of this particular character.

To the foregoing and other useful ends the invention consists in matters hereinafter set forth and claimed, and shown in the accompanying drawings, in which—

Fig. 3 is an enlarged horizontal section on line 3—3 in Fig. 1.

Fig. 4 is a plan of the filter plate through which the melted sulphur passes from the tumbling compartment of the apparatus.

Fig. 5 is a vertical section of the drawoff valve on the line 5—5 in Fig. 6.

Fig. 6 is a horizontal section of the drawoff valve on the line 6—6 in Fig. 2.

As thus illustrated, the apparatus employed in practicing the invention comprises an upright receptacle 1 which serves as a retort, and which has its upper end provided with two removable hand-hole covers 2 and 3, the first for use in charging the retort with the ore from which the sulphur is to be extracted, and both for use in cleaning out the retort. Said retort is supported by trunnions 4 disposed at opposite sides thereof, and said trunnions are supported by uprights 5 mounted on a suitable base whereby the tilting receptacle thus provided is supported in a suitably elevated position.

Figure 1:
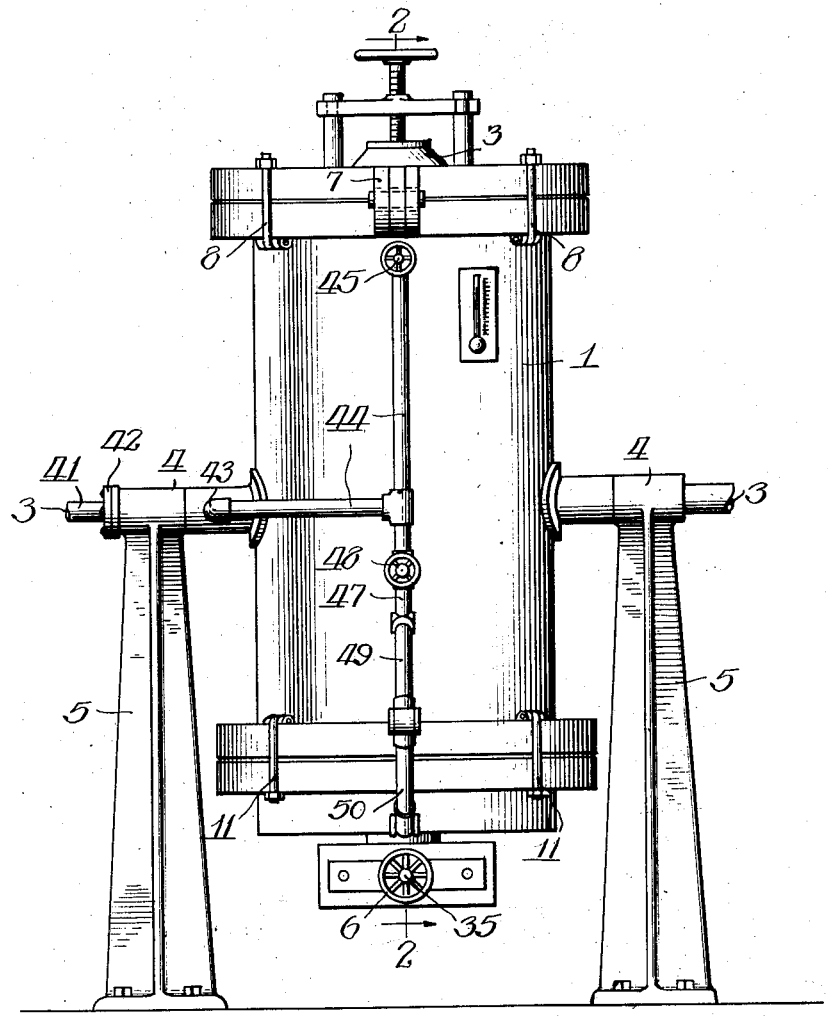
Fig. 1 is a side elevation of a sulphur extracting apparatus embodying the principles of the invention.
Figure 2:
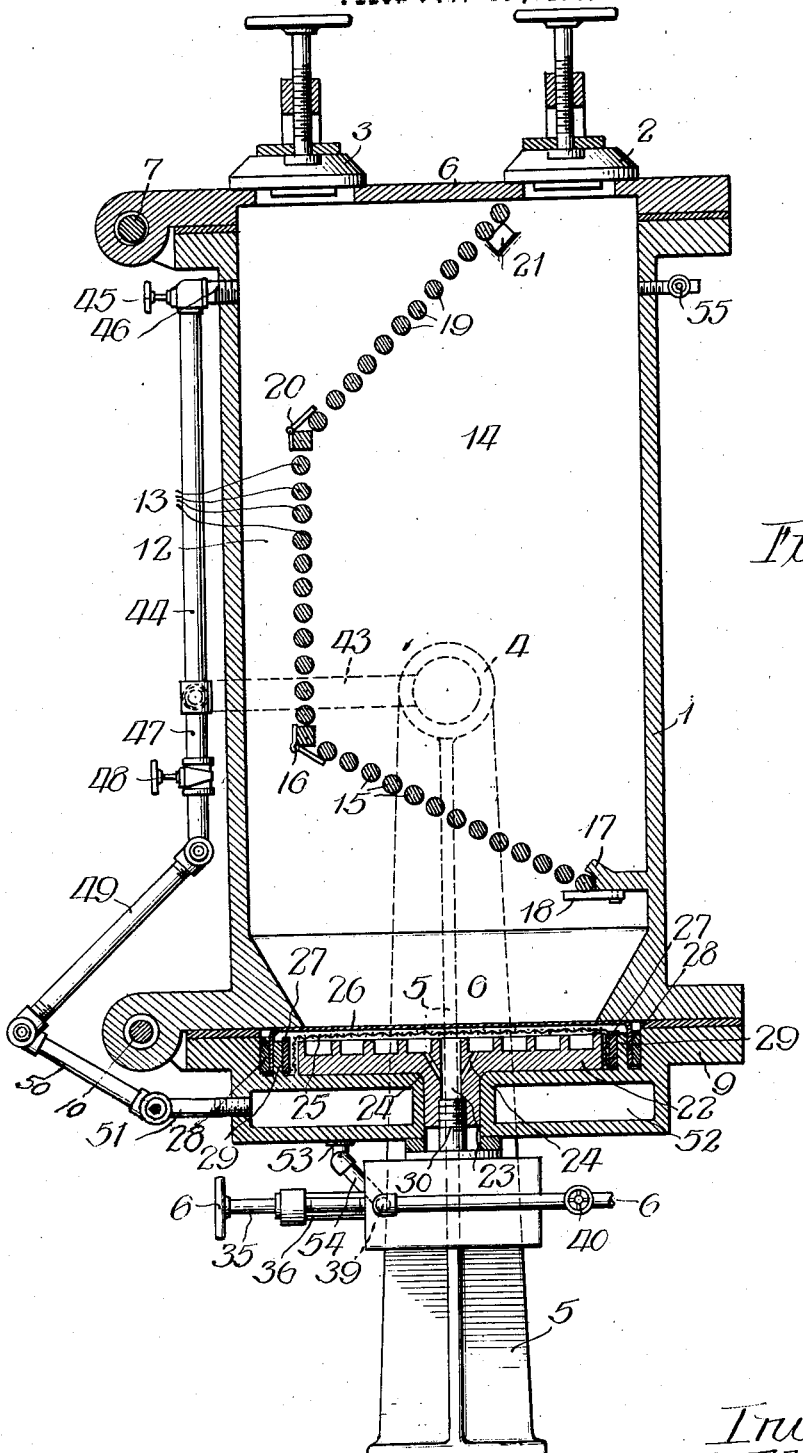
Fig. 2 is an enlarged vertical section on line 2—2 in Fig. 1.

The top plate 6 of the retort is hinged by hinges 7 and is held in place by hinged bolts 8 so that said plate may be swung back when said hinged bolts are loosened and the upper end of the retort opened when desired. The lower plate 9 of the retort is hollow, having within it a space to receive steam under pressure so as to heat said plate above the melting point of sulphur. It is also hinged by hinges 10 and held in place by hinged bolts 11 so that said plate may be swung back when said hinged bolts are loosened and the lower end of the retort opened when desired. Within the chamber or compartment 12 of the receptacle or retort 1 a suitable number of bars 13 are arranged to form a grating, and the compartment 14 enclosed by said grating receives the ore when the hand-hole cover 2 is removed, and retains the ore therein during the time that the apparatus is rocked back and forth to wash the melted sulphur and mud out of the ore, as will hereinafter more fully appear. In the lower portion of the grating is a door 15 shown in Figs. 2 and 3, hinged by hinges 16 and, when closed, held in place by a lug 17 and a lock or latch 18, by loosening which this door can be opened. In the upper portion of the grating is a similar door 19 shown in Fig. 2 hinged by hinges 20 to swing upward. When closed it is held in place between the lugs 21 and the upper plate 6 of the retort. When the upper plate of the retort is opened this door 19 can be opened at will. A grooved plate 22 is seated in said lower plate 9 of the retort. Said grooved plate has curved raised ridges, as shown in Fig. 4, forming recesses which are connected together by spaces formed in said ridges; and the center of the plate has a discharge opening 23, and openings 24 lead to said central discharge passage from the adjacent cavity formed between the curved ridges. Over the grooved plate 22 is placed a support 25 for the straining medium 26 hereinafter mentioned. Such support is preferably wire cloth of coarse mesh, and four wires to the inch has been found to be satisfactory. This wire cloth is fastened to the grooved plate 22 by a ring 27 which clamps the edges of such wire cloth to the outer circumference of said grooved plate. The straining medium 26, such as drilling or some kind of cloth, is disposed above the grooved plate 22 and rests on and is supported by the wire cloth. Such filtering medium is held in place by a ring 28 which clamps the outer edge of the filtering medium to another ring 29 which is integral with and extends upwardly from the lower plate 9 of the retort. Said discharge passage 23 has a valve which controls the downward discharge of the melted sulphur. Said valve (shown in section in Figs. 5 and 6) has a perpendicular passage 30 extending from the discharge passage 23 and emptying into a horizontal passage 31 which is connected with and empties through a perpendicular discharge passage 32 in the bottom of the valve casing 33. In the horizontal passage is a valve seat adapted to be closed by the plunger 34. Said plunger is moved and controlled by a screw 35. Between said plunger and said screw is a stuffing box 36 which prevents the melted sulphur as it is passing through the valve from reaching the screw. In the walls of said valve is a passage 37 surrounding said valve seat and plunger on three sides and having an inlet 38 and an outlet 39. When the valve is in use it is heated to a point above the melting point of sulphur by steam under pressure admitted to and circulating in said passage 37, the steam being admitted through the inlet 38 from a source hereinafter described, and then discharged through the outlet 39 which is provided with a suitable valve 40 for removing the water of condensation. A pipe 41 supplies steam or water as desired to the retort, and is connected with one of the hollow trunnions 4 by a stuffing box 42, so as to permit the rotation of the trunnion without rotating said pipe 41. From the trunnion 4, at a point between the retort and the upright support, extends a pipe 43 which, through the pipe 44, valve 45 and inlet 46, supplies steam or water as desired to the space within the retort. The pipe 43 is also, through the pipe 47 and valve 48, connected to the flexible pipe members 49 and 50 which connect, by means of the pipe 51, to the inside of the hollow lower plate 9 of said retort and supply steam to the chamber 52 for heating said lower plate. Through the outlet 53 and pipe 54 steam is supplied from the hollow lower plate 9 to the inlet 38 of the drawoff valve casing hereinbefore mentioned. A valve 55 is preferably provided at the top of the receptacle, for relieving the pressure after the operation of extracting the sulphur from the ore is completed, or at any time that it may become desirable to reduce the pressure. The grating 13, it will be understood, is so arranged that a space 56 is provided between the bottom of the grating and the top of the filtering medium, which space receives the melted sulphur, mud and earthy particles, and small pieces of ore. Preferably the door 19 in the upper portion of the grating and the door 15 in the lower portion of the grating are set in frames of proper size and shape to hold and support said doors. The grating is so arranged, it will be seen, that the heavier portions of the contents of the chamber or compartment 12, which is the space outside of the grating, can shift back and forth from the top to the bottom of the retort or receptacle, without passing back through the grating into the tumbling compartment where the larger pieces of ore are retained after being introduced through the hand-hole at the top of the receptacle. Thus, with the arrangement shown, the bottom of the tumbling compartment 14 is formed by the grating of the lower door 15, while one vertical side of this compartment is formed entirely by the grating, the latter being spaced a distance from the side of the receptacle; and, before the grating reaches the top of the receptacle, it assumes a slant or angle, to form the inclined door 19 which extends to a point near the hand-hole which is normally closed by the cover 2, so that space is provided below the hand-hole cover 3, between the grating and the walls of the receptacle, and whereby another space is provided which is somewhat narrower and which leads downward between the grating and the side wall of the receptacle to the space 56 at the bottom.

In the use of the apparatus for extracting sulphur from ore, the operation is as follows: To facilitate and hasten the process, the sulphur ore may be heated to some extent before placing it in the retort. This can be done by blowing steam at substantially atmospheric pressure into the ore contained in a hopper or any suitable receptacle. Such pre-heating, however, is not necessary for the practice of the invention. Either after such pre-heating or without it the hand-hole cover 2 is removed, and ore is placed in the space 14 which is enclosed by the grating within the receptacle. The said hand-hole cover is then secured in place, hot water is admitted through the hollow trunnion from the pipe 41, and thence through pipes 43 and 44, valve 45 and inlet 46, so that the required quantity of hot water is thus mixed with the ore. The contents of the retort or receptacle should be brought to a temperature of approximately 260° Fahrenheit, although other temperatures above the melting point of sulphur may work well enough and insure the desired results. The valve 45 is then closed, and the retort is rotated in the direction shown by the arrow in Fig. 2, for about 135°, until the upper inclined section of the grating 19 is about horizontal, and the rotation is then stopped. Then the receptacle is turned back in the opposite direction approximately 90° and until the said upper inclined section of the grating is about vertical, or it may be turned back to the position shown in the drawings. This forward and backward rotation or oscillation is continued for some time, generally from four to five minutes, as this has been found to be sufficient for the purpose. During this partial rotation or oscillating motion of the receptacle the ore mass therein slides first one way and then the other, and in this way, and by reason of the tumbling action caused thereby, the melted sulphur and the earthy matter are washed out of the ore and allowed to escape through the grating into the space within the retort not enclosed by said grating. The melted sulphur is heavier than water and consequently will flow back and forth in the receptacle outside of the chamber 14, without passing back through the grating, and some minute portions of the ore will also, of course, pass outwardly through the grating. There is thus formed within the retort and outside of the grating a mixture of hot water, melted sulphur, earthy matter and insoluble matter. The insoluble matter is in the form of minute pieces or particles much of which resembles grains of sand. All of it is small enough to have passed through the grating. The oscillating movement above described causes the separate body of melted sulphur outside of the ore mass to flow back and forth in the space outside of the grating and with it flows the hot water. The melted sulphur and hot water are by this means at times to an extent mixed together and different portions of said melted sulphur at different times come in contact with the hot water and the walls of the vessel on which the melted sulphur rests are washed and kept clean from earthy matter and the earthy matter, so far as is possible, is washed out of the melted sulphur and held in suspension by the water. Thus sulphur has been obtained which strained readily and after straining contained only one-quarter of 1% of earthy matter. If the retort during the extraction of the sulphur stood at rest with its longitudinal axis in horizontal position and with the ore chamber above the portions of the retort not enclosed by the grating, melted sulphur would pass through the grating and form a separate body or pool of melted sulphur under the grating. The hot water would rest on the top of this pool. It would not come in contact with the melted sulphur in this pool except on its upper surface. The earthy matter which is desired to wash out is mostly within this separate body or pool of melted sulphur and some of it at least sinks to the body of this pool. Hot water would not enter the body of sulphur in this pool to wash it and would not come in contact with different portions of this separate body of melted sulphur and at different times. It would not wash from this separate body or pool of melted sulphur the earthy matter contained within it. Neither would it wash the walls of the vessel on which the melted sulphur rests, but on the contrary such walls would become dirty and necessarily soil the liquid sulphur. Ordinarily, it is only the mud or like matter which has any marked tendency to clog the strainer. By said oscillating movement, the filtering medium is also washed clean or kept clean and free from mud or earthy matter. The melted sulphur is heavier than the mixture of hot water and mud and other matter. When the retort is returned to the position shown in the drawings, the melted sulphur (washed thoroughly in the manner stated) will repose beneath the mixture of hot water and earthy matter and directly over and in contact with the straining medium which has also itself been cleaned or kept clean of mud or earthy matter by the motion of the water as hereinbefore stated. As a result of these conditions the sulphur passes readily through the straining medium, and little or no difficulty is experienced on account of the clogging of said medium. Either during the rotation or immediately thereafter, the valve 48 is opened and steam at a temperature considerably above the melting point of the sulphur is admitted to the hollow plate 9 and to the passage 37 of the drawoff valve. Ordinarily, steam under pressure of about forty pounds will serve the purpose. The valve plunger 34 is then opened and the melted sulphur is discharged through the drawoff valve and is recovered in any suitable or desired manner. If the spaces in the retort outside of the tumbling compartment 14 are large enough, it would be unnecessary to repeat the oscillating motion or the drawing off of the sulphur, but in practice the following method is preferable: After the said valve 34 has remained open until the water begins to pass out, the valve is then closed. The said retort or receptacle is then again rotated or oscillated as previously described, and this second operation should be continued for some time. Two minutes is generally sufficient for this purpose. Finally the retort is brought to a position in which the straining medium 26 is substantially horizontal and the retort in the position shown in the drawings. More sulphur then accumulates above the said straining or filtering medium, and the valve 34 is again opened to draw off the melted sulphur. The length of time necessary for the operation will vary somewhat, of course, and must be determined by experiment, or by judging the quantity and quality of the ore, thereby to insure the best results. This partial rotation or oscillation of the receptacle and drawing off of the sulphur should continue until little or no further sulphur can be obtained by opening the discharge valve. Steam may from time to time be admitted by the valve 45 to keep up the desired heat or pressure. When the sulphur is exhausted from the ore, the valve 55 should be opened to relieve the pressure in the retort. The hand-hole covers 2 and 3 are then removed, and the retort or receptacle is then turned upside down so that its contents will be discharged therefrom. The hand-hole cover 3 is then fastened in place and the retort is ready to be filled for another operation. From time to time after the retort has been used, but not necessarily after each operation, the hinged bolts 8 and 11 holding the upper and lower plates are loosened, and the plates are swung back to open the ends of the retort. The doors 19 and 15 in the upper and lower portions of the grating are also opened and the retort is cleaned in any suitable manner, as with a hose. The filtering medium 26 should also (from time to time, when necessary) be renewed by removing the ring 28 and taking out the used filtering medium and fastening a new one in its place, with said ring, as hereinbefore described. The doors in the grating are then closed and locked as hereinbefore described. The ends of the retort are closed and the hinged bolts put in place and tightened and the apparatus is again in condition for use.

It is obvious that any suitable means can be employed for oscillating the retort 1, about the horizontal axis provided by the trunnions. For example, the trunnion shaft 57 may be extended in any suitable manner and provided with any suitable, known or approved means for oscillating the retort in the manner described. The filter plate 22, as shown, is removable, and preferably formed of any material suitable for this purpose, and in the shape or form shown in the drawings, although the formation may, of course, be varied more or less without interfering with its function and the desired operation of the apparatus. It will be understood, of course, that the connection to the pipe 41 must be of such a character as to permit the oscillation of the retort, and may extend to means for supplying the water and the steam, so that either or both can be supplied at will to the retort in the manner described. Various materials may be used for the different elements of the apparatus. The grating (13—15—19) is preferably formed by aluminum tubes reinforced by steel bars therein. Also the plate 22 and the discharge valve below are preferably made of aluminum.

With the foregoing method, and with the apparatus thus shown and described, the sulphur, after being melted, and after passing away from the ore mass, is washed by the hot water during the oscillation of the retort, as it is heavier than the water and is subject to the action of gravity which causes it to settle and stay at the bottom of the body of water, regardless of the position in which the retort is turned, whereby the melted or liquid sulphur accumulate in a state of agitation by itself and flows back and forth under the body of water and below the ore mass during the oscillatory motion of the retort, and is practically free from mud and other matter when it finally settles by gravity upon the upper surface of the filtering medium. Of course, the entire ore mass is not left in the space enclosed by the grating, but to the contrary more or less of the mass, depending upon the quality and character of the ore, and the method in which it is prepared for the retort, will sift between the bars of the grating out of the enclosed space 14 when the retort is filled and prior to the admission of hot water, will be washed through the spaces between the bars of the grating, and will either remain in suspension in the water or will remain undissolved in the form of sand or small pieces of hard ore. It would not be a departure from my invention if the operator in filling the retort should place within it and outside of the space 14 enclosed by the grating such portions of the ore mass as might be sifted through or washed through the grating, but, even so, the fact remains that the larger pieces of the ore mass are restrained and prevented from entering that portion of the body of water into which the melted sulphur flows, so that in a general way the sulphur is washed out of the ore mass and melted and allowed to flow away into an area where the ore cannot follow, and where the back and forth flowing motion or swashing about of the melted sulphur in the hot water causes a thorough washing or scrubbing of the sulphur; and inasmuch as the sulphur is heavier than the water, and is of even greater specific gravity than the water and the matter or elements held in suspension therein, it follows that the liquid or melted sulphur with only a comparatively small percentage of ore or earthy matter is thus separated and delivered to the filtering or straining medium, through which latter it passes by reason of gravity and the pressure maintained in the retort during the operation. As the liquid or melted sulphur at, for example, 248° to 260° Fahrenheit, is very liquid, even more so than water, gravity is sufficient to force or cause it to pass through the filtering or straining medium, but what steam pressure is necessary or desirable in the retort during the operation will also, of course, assist somewhat in forcing the liquid sulphur through the porous material forming the filtering or straining medium.

With the foregoing method, it will be seen that water is used at some stage of the process, preferably hot water to melt the sulphur out of the ore. Also, as shown and described, the water thus employed serves to wash the earthy and other matter out of the ore rock mass, and to wash the melted sulphur out of said mass, so that the liquid melted sulphur gradually accumulates in a state of agitation outside of the compartment 14 in which the ore mass is retained throughout the melting and washing operation. In this way the liquid melted sulphur accumulates by itself at a point outside of the ore rock mass, and is washed by the same water which melts and washes the sulphur out of the ore. This hot water also washes the filtering medium 26 and keeps the latter clean during the time that the receptacle is being rocked back and forth to melt and wash the sulphur out of the ore mass, and to wash the gradually accumulating liquid melted sulphur outside of said mass, whereby the ore mass does not come in contact with the filtering medium, notwithstanding that the same body of water which melts the sulphur out of the ore is in direct contact with said filtering medium. The filtering operation, of course, involves the transferring of the liquid melted sulphur from an area under pressure to an area of less pressure, inasmuch as the pressure in the receptacle 1 is higher than the pressure below the filtering device, whereby the liquid melted sulphur is forced through the filtering medium by fluid pressure, as well as by gravity, after the sulphur is extracted from the ore and thoroughly washed in the compartment 12 outside of the ore rock mass. The liquid melted sulphur thus gradually accumulated outside of the ore rock mass, in the space or compartment 12, is subject to the same tumbling action that the ore rock mass itself is subjected to during the operation of melting and washing out the sulphur, but the melted sulphur is tumbled about separately, entirely outside of the ore mass, notwithstanding that both the sulphur and the ore rock mass are subject to the same fluid pressure and are washed by the same body of hot water, the oscillation of the receptacle serving to tumble the ore mass and the liquid melted sulphur about in the same body of water, but in a manner that keeps the ore rock mass segregated and out of contact with the liquid melted sulphur, as well as out of contact with the filtering means by which the melted sulphur is finally discharged from the relatively high pressure area to the relatively low pressure area, in the manner explained.

With the foregoing method it will be seen that a novel and peculiar action takes place. The ore mass as a whole is alternately spread out into a loose condition and reduced to a smaller or more dense body. When the machine is oscillated into position to drop the ore mass in compartment 14, (it slides down hill) the ore then gravitates freely in a loose condition through the hot water, the mass in this way being temporarily opened up to allow the hot water to act upon all portions of the ore, thereby to melt the sulphur and soften the mud and earthy matter. The gravitational movement of the ore is terminated so abruptly, however, as explained, that the mass of ore rock and all of the sulphur and earthy matter remaining therewith are compressed into compact form, which amounts to a reduction of the area of the mass as a whole. As the machine rocks first in one direction and then in another, the gravitational movement of the ore is followed by a period of compression thereof, in such a manner that the compressed or compacted mass hesitates, momentarily at least, in stationary position each time before again being raised and allowed to gravitate loosely through the water. These two conditions of the ore (first, the loose and free gravitation of the ore through the hot water; second, the compacting of the ore body into a tight mass at the lower end of the compartment 14, depending upon which end is lowermost) alternate with each other until the sulphur is melted out of the ore. As the ore falls or gravitates or slides down hill through the hot water, after being raised beyond the angle of repose, it is washed by the hot water, for the lumps of ore gravitate rapidly through the body water, and this action is immediately followed by such an abrupt or violent termination of this gravitational movement of the ore that a considerable compression or compacting of the mass results from this process or method, so that melted sulphur and other matter which has been softened by the hot water will be squeezed out of the mass and allowed to escape through the grating into the other chamber. This, it is found, facilitates the operation of melting the sulphur out of the ore, and shortens the time necessary for the treatment of the batch of ore or ore mass for this purpose.

When the filtering medium is turned upside down, the mud and sulphur and other substance fall away from said medium, and the water then washes said medium, of course, before the liquid sulphur and mud and other substance fall back upon the filtering medium when the latter is again turned right side up. For the purpose of the step involving the alternate freeing of the filter of its load, and dropping the ore and sulphur first away and then upon the filter, the heat can be supplied in any suitable or desired manner, but preferably by means of moisture heat, and for the purpose of washing the filter hot water is preferably used.

Obviously, the intent and purpose of the commingling of the liquid melted sulphur with the water, by washing the body of liquid sulphur back and forth in the body of the water, is intended to ultimately bring all portions of the melted sulphur into contact with the water, thereby to wash out other matter therein. In other words, the shape of the body of melted sulphur is changed everywhere, by the agitating action, with the intent and purpose of at the same time bringing each and every portion of the melted sulphur into contact with the water, and this cannot be done unless there is more or less agitation of the entire body of liquid sulphur. One liquid must be forced through the other, in order to obtain the desired result, and as shown and described the liquid melted sulphur is gravitated first in one direction and then in the other, through the body of hot wash water, and this causes the water to be forced into and through the liquid sulphur. When this has been done sufficiently, as described, the process of extracting sulphur from ore, or of washing dirty sulphur, is completed by drawing off the clean sulphur. For the drawing off of clean sulphur, there must not only be a body of clean liquid sulphur which is without mud or dirt or other matter anywhere therein, not only at the top but also at the bottom thereof, but there must also be preferably a cleansing of the filter and drawing off means as well as a general washing of the interior of the apparatus. In other words, there must be such a washing and scrubbing action that mud and earthy matter are held in suspension in the water, above the body of liquid sulphur, if it is not desired to draw off any earthy matter with the sulphur and hence the filter is preferably clean and washed at the time that the washed sulphur is drawn off. The sulphur is shifted back and forth, and the surface, vacated each time by the sulphur when it shifts to a different position, is washed clean by the water.

What I claim as my invention is:—

1. A process for extracting sulphur from ore, comprising the agitation of the entire ore mass by tumbling it about in hot water, thereby to melt the sulphur out of the ore, so that the melted sulphur gradually accumulates in a separate body and is tumbled about and agitated outside of the ore rock mass from which the earthy and other elements are also washed by the action of the water, and thereafter subjecting the melted sulphur to a filtering action, so that the sulphur thus melted is separated from the mud and minute portions of ore washed out of the mass.

2. A process as specified in claim 1, in which the filtering action immediately follows the tumbling action, so that the melted sulphur passes as a liquid directly from the tumbling action to the filtering action.

3. Apparatus for extracting sulphur from ore, comprising an oscillatory retort for containing the ore mass, means for introducing hot water into said retort, to melt the sulphur therein, while the ore and water are being tumbled about by the oscillation of the retort, means to keep the ore mass and the extracted melted sulphur separate and filtering or straining instrumentalities at the bottom of said retort, so that by gravity and pressure in said retort the liquid or melted sulphur will be driven from the retort through the filtering or straining instrumentalities, leaving the ore and more or less of the mud and earthy matter remaining in the retort.

4. A structure as specified in claim 3, said retort having a compartment therein for the ore mass, one or more of the walls of said compartment having openings to permit the water and the melted sulphur to pass through, so that as much as possible of the ore mass will remain in said compartment while the melted sulphur is free to pass out, whereby the ore mass and hot water are tumbled about within said compartment while the melted sulphur and mud and smaller particles of ore are tumbled about outside of said compartment and within the retort.

5. A process for extracting sulphur from ore, comprising the washing of the ore mass with hot water to melt and wash out the sulphur, passing the melted sulphur through a filtering or straining medium, while keeping the ore mass out of contact with said medium, and during said washing operation and before the filtering action employing the same water which is washing the ore mass to also wash and keep the filtering medium clean during the operation of extracting the sulphur from the ore thereby to prevent clogging which would interfere with the filtering or straining operation.

6. The process as specified in claim 5, in which the washing of the ore is produced by a tumbling action thereof, so that the sulphur when melted settles to the bottom, and in which steam pressure is maintained on the water above the filtering or straining medium, and the mud and other matter remain in suspension in the water, the ore mass being restrained to prevent it from coming in contact with the filtering medium, so that the melted sulphur will escape into the body of water and finally settle on the filtering or straining medium.

7. In apparatus for extracting sulphur from ore, the combination of a receptacle forming a retort, a hinged base plate for the bottom of said retort, means to hold said base plate in position to close the bottom of the retort, means whereby the retort is oscillatory about a horizontally disposed axis, pipe connections leading to said retort, said base being hollow to receive steam, a hinged connection between said hollow base and said pipe connections, filtering or straining instrumentalities on said base, having a suitable discharge passage, and means carried by the base to discharge the melted sulphur from said passage.

8. In apparatus for extracting sulphur from ore, the combination of a receptacle forming a retort, and grating in said retort to form a compartment therein to receive the ore, said grating comprising a lower inclined door section, an upper inclined door section, and a fixed side section, together with means for holding said door sections in closed position.

9. A structure as specified in claim 8, in combination with means for rotating or oscillating said retort to tumble the ore about in said compartment, while the melted sulphur and water and other matter and small particles of ore are tumbled back and forth in the retort outside of said compartment.

10. The process of extracting sulphur from ore, comprising the washing of the ore mass with hot water to melt the sulphur out of the ore, and at the same time washing the gradually accumulating melted sulphur by tumbling it about in the same body of hot water in which the ore mass is washed, so that the melting and washing of the sulphur are carried on simultaneously but entirely separately in the same body of hot water, and whereby in addition to the melted sulphur only small pieces of ore and sand and insoluble matter will settle by gravity to the bottom of the body of water, the larger pieces of ore and insoluble matter being restrained from following the melted sulphur out of the body of ore, and thereafter drawing off the melted sulphur from its final resting place at the bottom of the body of water.

11. A process as specified in claim 10, in which the said washing of the ore mass and the more or less separate washing of the liquid or melted sulphur is accomplished by a tumbling action which causes the water to flow back and forth through the mass of ore, and which causes the melted sulphur to flow back and forth at the bottom of the body of water.

12. The process of extracting sulphur from ore, comprising the washing of the ore mass with hot water to melt out the sulphur, and the more or less separate washing of the liquid melted sulphur in the same body of hot water, as the sulphur gradually flows from the ore mass and accumulates in a body, at a distance from the ore mass, by agitating the water and the separate body of sulphur together in a manner intended to cause the washing action to reach all portions of the accumulated liquid sulphur, and finally recovering the sulphur.

13. The process of extracting sulphur from ore, comprising the washing of sulphur bearing ore in hot water, thereby to melt out the sulphur, washing the accumulated melted sulphur separately in hot water, by shifting the melted sulphur back and forth in the hot water, thereby to wash out of the melted sulphur the other matter remaining therein, so that the liquid melted sulphur gradually accumulates in a body by itself, and thereafter recovering the sulphur.

14. In apparatus for extracting sulphur from ore, the combination of a receptacle forming a retort, and grating in said retort to form a compartment therein to receive the ore, in combination with means whereby to obtain access to said compartment.

15. The process of extracting sulphur from ore, comprising the washing of sulphur-bearing ore in hot water, thereby to melt out the sulphur, washing the liquid melted sulphur in a body of hot water in a manner intended to cause the washing action to reach all portions of the accumulated liquid sulphur, thereby to wash out of the melted sulphur the other matter therein, so that the melted sulphur gradually accumulates in a state of agitation by itself at the bottom of said body of water, and thereafter straining said sulphur away from the other matter.

16. The process of extracting sulphur from ore, comprising the washing of the ore mass with hot water to melt out the sulphur, washing the liquid melted sulphur by agitation of the entire body thereof separately in hot water in a manner intended to cause the washing action to reach all portions of the accumulated liquid sulphur, thereby to wash out the other matter therein, and thereafter separating said sulphur from said other matter.

17. A process for extracting sulphur from ore, comprising the alternate opening up of the body of ore and the drawing together thereof in hot water, so that the ore first gravitates loosely and in a spread out condition through the water and is then reduced to a compact mass in the hot water, to soften the earthy matter and to melt out the sulphur.

18. A process as specified in claim 17, in which the ore mass in its more compact condition hesitates each time in stationary position before again gravitating loosely through the water.

19. A process as specified in claim 17, in which each gravitational movement of the ore loosely through the water is terminated so abruptly that by impact the mass is reduced to compact form, compression of the mass thus alternating with the free and loose action thereof until the sulphur is melted.

20. The process of extracting sulphur from ore, comprising the alternate raising and lowering of the ore mass in hot water, so that the ore gravitates or falls a distance in a loose condition each time after being raised, with a definite pause each time before the ore is raised again and whereby the water melts and washes out the sulphur.

21. A process for extracting sulphur from ore, comprising the washing of the ore mass with hot water to melt and wash out the sulphur, employing said water and the washing action thereof to wash and clean a filtering medium, and passing said melted sulphur through said filtering medium.

22. A process for extracting sulphur from ore, comprising the alternate opening up of the body of ore and the drawing together thereof in heated fluid, so that the ore first gravitates loosely and in a spread out condition through the fluid and is then reduced to a compact mass in the heated fluid to soften the earthy matter and to melt out the sulphur.

23. A process as specified in claim 22, in which the ore mass in its more compact condition hesitates each time in stationary position before again gravitating loosely through the fluid.

24. A process as specified in claim 22, in which each gravitational movement of the ore loosely through the fluid is terminated so abruptly that by impact the mass is reduced to compact form, compression of the mass thus alternating with the free and loose action thereof until the sulphur is melted.

25. A process for extracting sulphur from ore, comprising the melting of the sulphur in the ore, and flowing the liquid sulphur out of the ore mass and through a filtering medium to separate the sulphur from other substance, said filtering medium being alternately turned upside down then right side up during the melting operation, so that the ore and the gradually accumulating liquid sulphur are alternately shifted to and from said medium.

26. A process as specified in claim 25, said melting being produced by hot water which also forms mud, which falls off the filtering medium each time the latter is turned upside down, whereby the melting water serves also to wash said medium before the melted sulphur is filtered away from the other substance.

27. The process of extracting sulphur from ore, comprising the washing of the ore mass in hot water to melt out the sulphur, agitating the separate body of melted sulphur with hot water, thus mixing said melted sulphur with said hot water in a manner intended to cause the washing action to reach all portions of the accumulated liquid sulphur, thereby to wash out of the melted sulphur other matter contained therein, and thereafter drawing off the clean sulphur.

28. A process of extracting sulphur from ore, comprising the alternate opening up of the body of ore and the drawing together thereof in a fluid so that the ore is first in a spread out condition in the fluid and is then reduced to a compact mass to extract the sulphur.

29. The process of extracting sulphur from ore, comprising the melting of the sulphur in the ore and flowing the liquid sulphur through a filtering medium to separate the sulphur from other substances, while the melting progresses without interruption, said filtering medium at some time between filtering operations being held in a position in which matter thereon will gravitate therefrom.

30. The process of cleaning dirty sulphur, comprising the agitating of the body of liquid melted sulphur with hot water and mixing said melted sulphur with the hot water in a manner intended to cause the washing action to reach all portions of the accumulated liquid sulphur, thereby to wash out of said melted sulphur other matter contained therein and thereafter recovering said sulphur.

31. The process of cleaning dirty sulphur, consisting of agitating the body of melted sulphur with hot water so as to mix them together more or less and wash out of said melted sulphur other matter therein and thereafter straining said melted sulphur through a filtering medium which filtering medium is at some time between successive filtering operations and during the washing operation placed in such position that matter thereon will fall or slide off to present a clean surface each time to the returning mixture of sulphur and water.

32. In a process for extracting sulphur, by using hot water to melt the sulphur out of the ore mass, the agitating or tumbling, and washing back and forth, of the separated body of the melted sulphur.

33. The process specified in claim 32, comprising also the use of this separate agitating or tumbling, and washing back and forth, of the body of melted sulphur with hot water to keep the filter clean.

34. The process of extracting sulphur from ore, comprising the washing of the ore mass in hot water to melt out the sulphur, washing the separate body of melted sulphur by agitating the same with hot water in a manner intended to cause the washing action to reach all portions of the accumulated liquid sulphur, thereby to wash out the other matter therein, and thereafter drawing off the clean sulphur.

35. The process of cleaning dirty sulphur, comprising the agitating of the body of liquid melted sulphur with hot water in a manner intended to cause the washing action to reach all portions of the accumulated liquid sulphur, thereby to wash out of said melted sulphur other matter contained therein and thereafter drawing off the clean sulphur.

36. The process of extracting sulphur from its ore, comprising the washing of the ore mass in hot water to melt and wash out the sulphur, separating the liquid sulphur from the ore mass and employing said water and the washing action thereof to wash and keep clean the walls of the receptacle on which said liquid sulphur rests, by causing the liquid sulphur and water to move from one place to another on said surface, with a washing each time of the surface vacated by the sulphur.

37. The process of extracting sulphur from its ore, comprising the confining of the ore and hot water in a closed vessel, washing the ore in the hot water to melt out the sulphur, accumulating said melted sulphur in a body by itself in said hot water, moving said body of melted sulphur or portions thereof and changing the shape everywhere of said body of melted sulphur so that all portions thereof are intended from time to time to come in contact with the hot water to wash out of said liquid melted sulphur other matter therein and finally drawing off the clean sulphur.

38. The process of cleaning dirty sulphur, comprising the confining of the body of melted sulphur in a closed vessel with hot water, moving said body of melted sulphur or portions thereof and changing its shape everywhere so that all portions thereof are intended from time to time to come in contact with the hot water to wash out of said melted sulphur other matter therein and finally drawing off the clean sulphur.

39. The process of cleaning dirty sulphur, comprising the washing of melted sulphur in hot water to wash out of it other matter therein, passing said melted sulphur through a filtering medium and employing said water between filtering operations to wash and clean said filtering medium, and finally drawing off the clean sulphur.

40. The process of cleaning dirty sulphur, comprising the washing of melted sulphur in hot water, employing the washing action of the water to wash and clean a filtering medium and passing said melted sulphur through such filtering medium.

41. The process of cleaning dirty sulphur, comprising the tumbling thereof about in a body of hot water to wash out of said melted sulphur other matter therein and thereafter recovering the washed sulphur.

42. The process of cleaning dirty sulphur, comprising the shifting thereof back and forth in hot water to wash out of said melted sulphur other matter therein and thereafter recovering the washed sulphur.

43. The process of extracting sulphur from its ore, comprising the confining of hot water and sulphur ore in a closed vessel, washing the ore mass in hot water to wash out the sulphur, accumulating the liquid sulphur by itself within the vessel and while said liquid sulphur is accumulating moving said liquid sulphur about so as to expose to the hot water and the washing action thereof portions of said vessel on which said liquid sulphur rested before it was moved, and employing said water and the washing action thereof to wash and keep clean said portions of said vessel.

44. The process of cleaning dirty sulphur, comprising the confining of hot water and liquid sulphur in a closed vessel, agitating said liquid sulphur and hot water together to wash out other matter in said liquid sulphur and while said liquid sulphur is being so washed moving said liquid sulphur about so as to expose to the hot water and the washing action thereof different portions of said vessel on which said liquid sulphur rested before it was moved, and employing said water and the washing action thereof to wash and keep clean said portions of said vessel.

45. The process of cleaning dirty sulphur, comprising the mixing of melted sulphur with hot water in a manner to cause the washing action to reach all portions of the liquid sulphur, thereby to wash out of said melted sulphur other matter contained therein and thereafter recovering the sulphur.

46. The process of cleaning dirty sulphur, comprising the confining of the body of melted sulphur in a closed vessel with hot water, moving said body of melted sulphur or portions thereof and changing its shape everywhere for the purpose of causing all portions thereof from time to time to come in contact with the hot water to wash out of said melted sulphur other matter therein and finally recovering the clean sulphur.

47. The process of cleaning dirty sulphur, comprising the washing of melted sulphur in hot water to wash out of it other matter therein, passing said melted sulphur through a filtering medium and employing said water between filtering operations to wash and clean said filtering medium, and finally recovering the clean sulphur.

WILLIAM P. THORNTON.